Jan. 28, 1941.  E. A. SLYE ET AL  2,230,147
REGISTERING AND COMPUTING MECHANISM
Filed Nov. 6, 1939  6 Sheets-Sheet 1
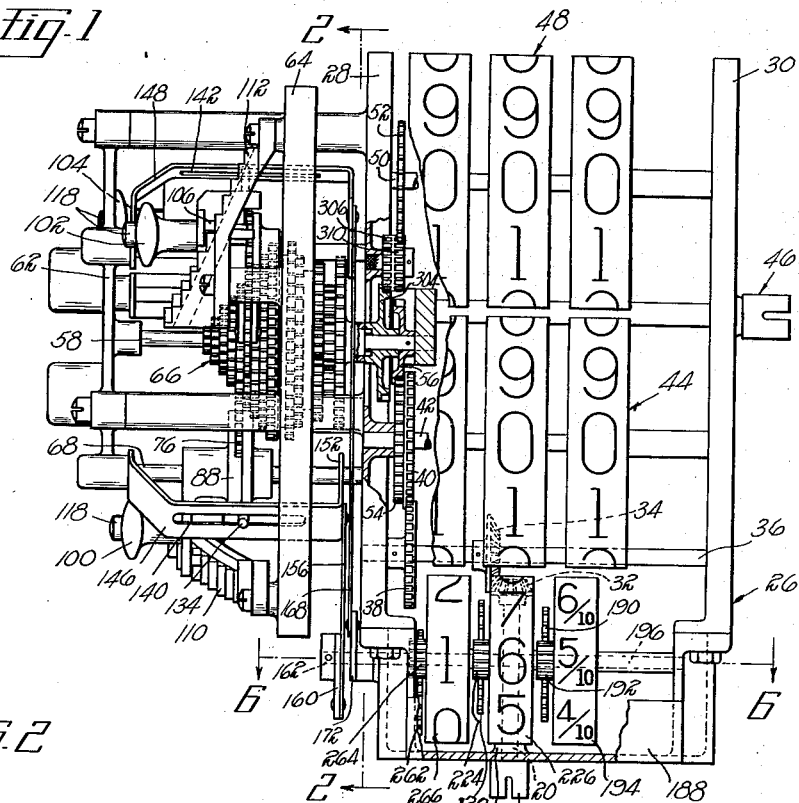
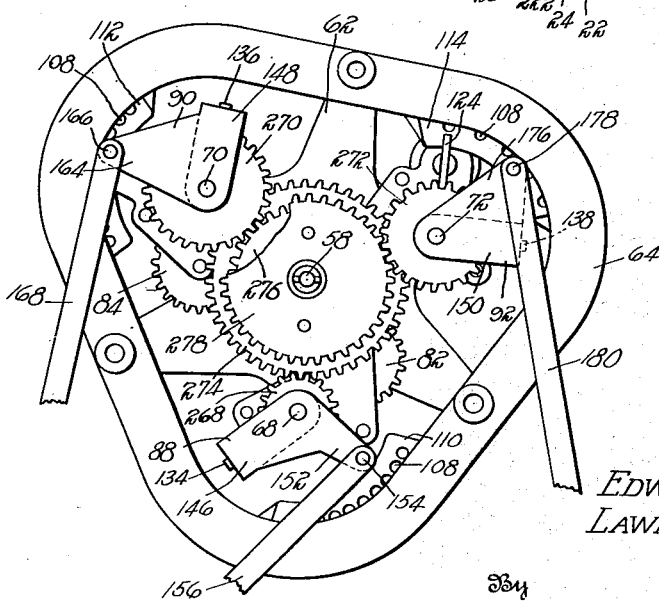
Inventors
EDWARD A. SLYE
LAWRENCE G. YOUNG
By Atkinson, Husley, Byron v Knight
Attorneys

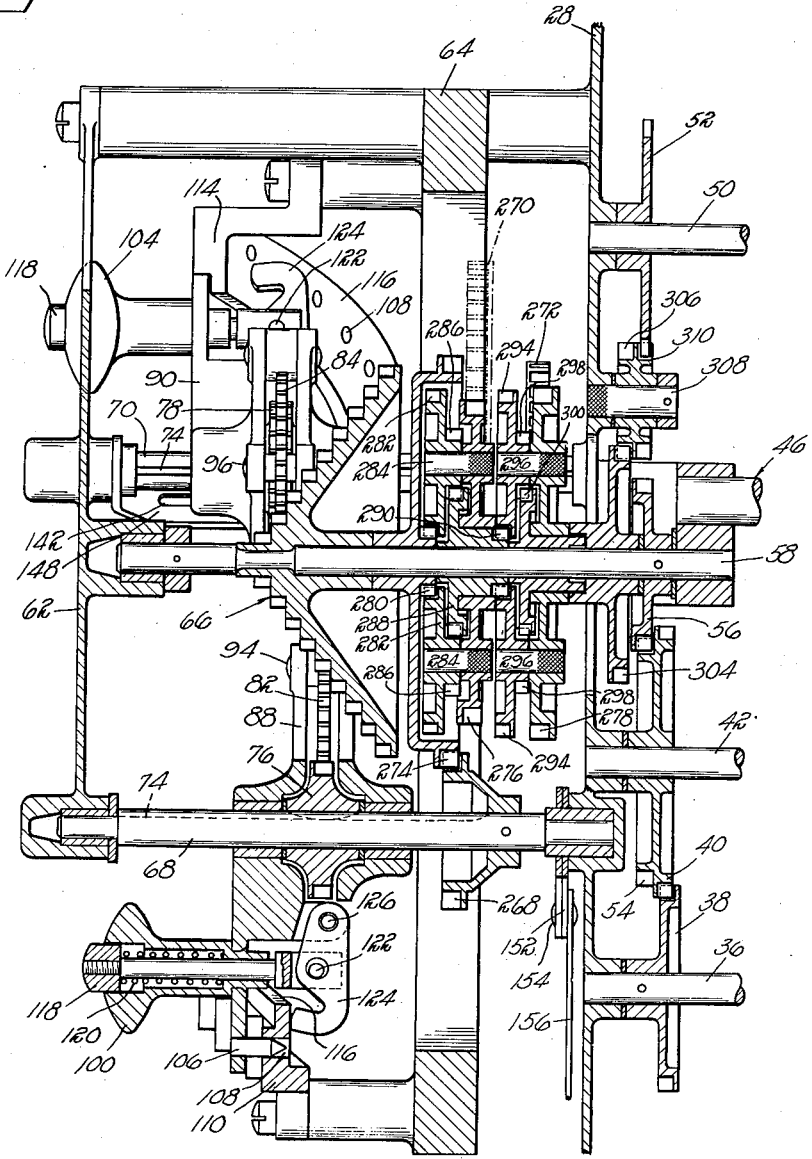

Jan. 28, 1941.  E. A. SLYE ET AL  2,230,147

REGISTERING AND COMPUTING MECHANISM

Filed Nov. 6, 1939  6 Sheets-Sheet 3

Inventors
EDWARD A. SLYE
LAWRENCE G. YOUNG

Jan. 28, 1941.  E. A. SLYE ET AL  2,230,147
REGISTERING AND COMPUTING MECHANISM
Filed Nov. 6, 1939   6 Sheets-Sheet 4
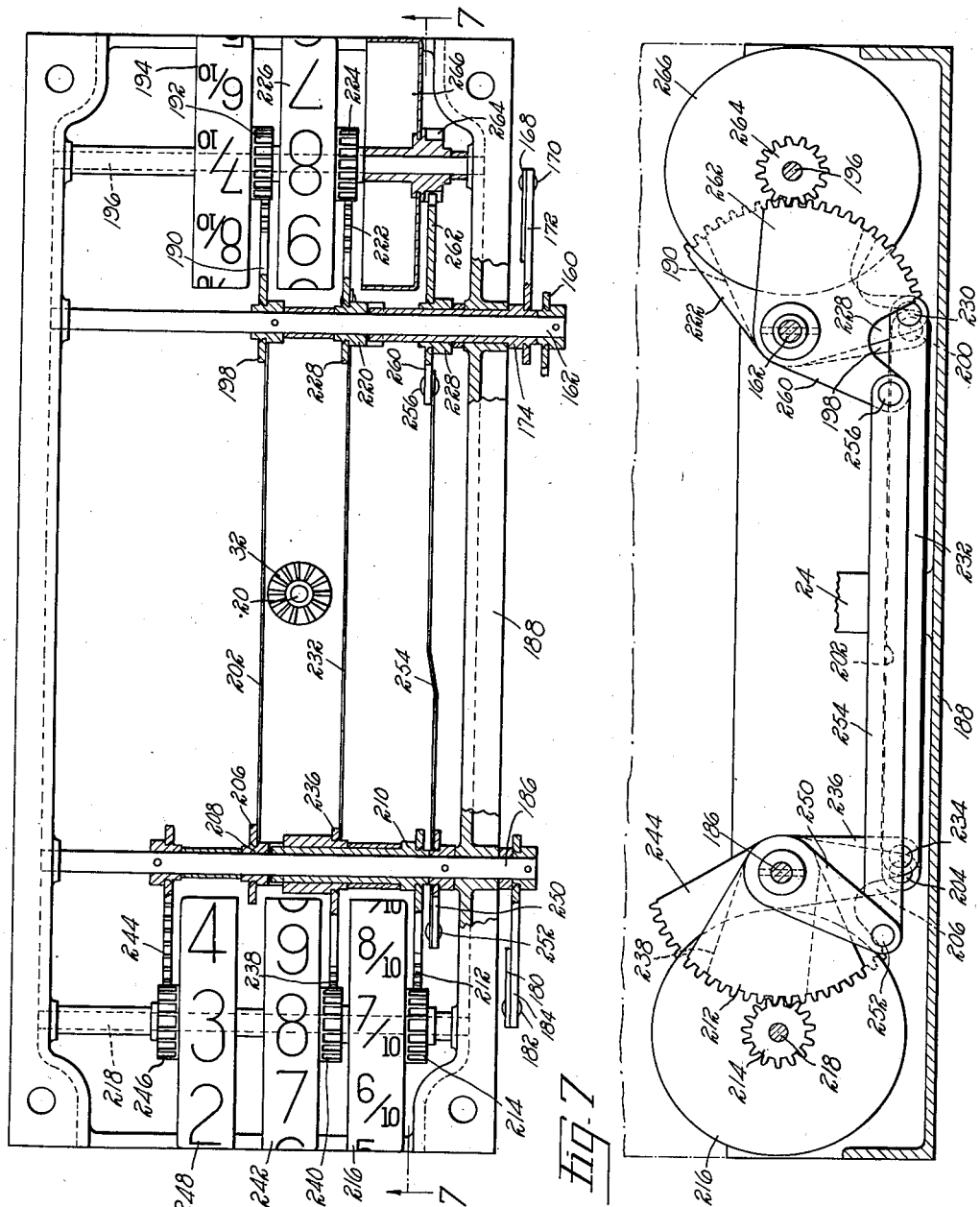
Inventors
EDWARD A. SLYE
LAWRENCE G. YOUNG

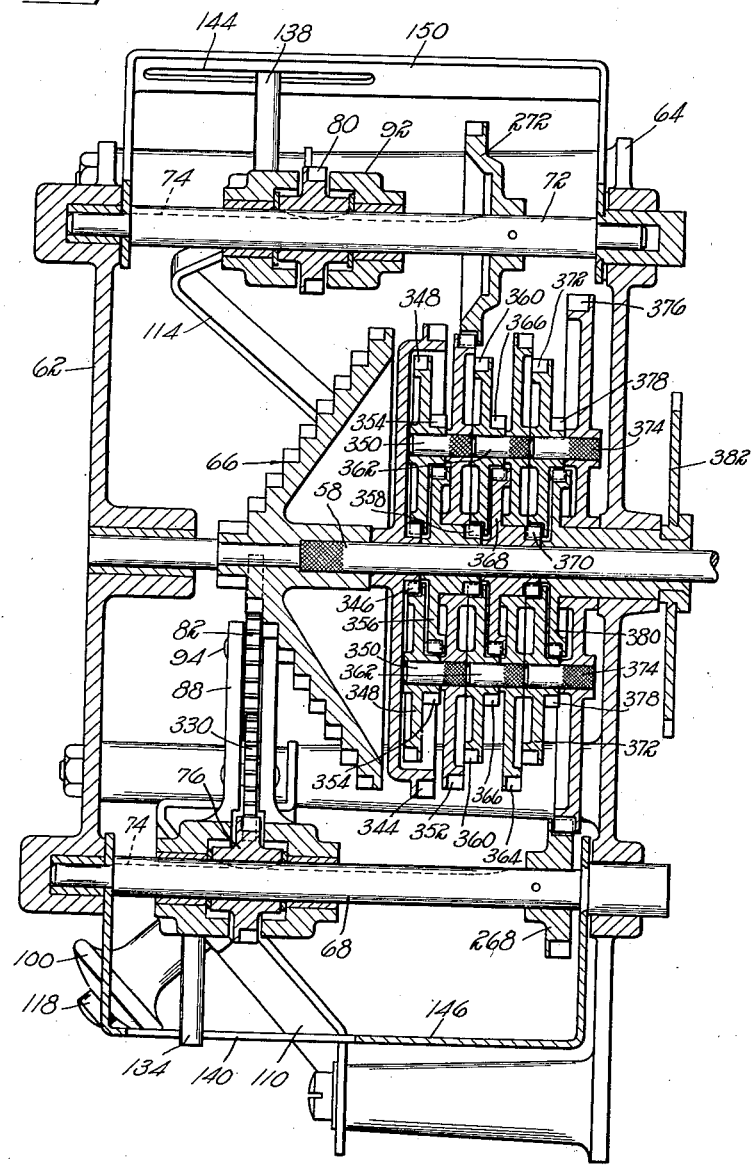

Jan. 28, 1941.  E. A. SLYE ET AL  2,230,147
REGISTERING AND COMPUTING MECHANISM
Filed Nov. 6, 1939  6 Sheets-Sheet 6

Inventors
EDWARD A. SLYE
LAWRENCE G. YOUNG

Patented Jan. 28, 1941

2,230,147

UNITED STATES PATENT OFFICE 2,230,147

REGISTERING AND COMPUTING MECHANISM

Edward A. Slye, East Hartford, and Lawrence G. Young, Windsor, Conn., assignors, by mesne assignments, to The Wayne Pump Company, Fort Wayne, Ind., a corporation of Maryland Application November 6, 1939, Serial No. 303,041

19 Claims. (Cl. 74—283)

This invention pertains to a computing head and more particularly to variating means therefor.

It is an object of this invention to provide a computing head wherein the variator is mounted horizontally to permit ready setting of the device from one side thereof.

Another object is to provide a registering and computing mechanism wherein the calibrations may be made in at least one-hundredth (1/100) of a cent by simple, rugged and inexpensive mechanism.

Still another object of the invention is to provide speed variating mechanism which is provided with means tending always to maintain the device in fully set position.

Yet another object of the invention is to provide a computing head having simple and inexpensive daily price indicating means operable as the variator of said head is set.

A further object of the invention is to provide a side variator for a computing head wherein the setting is effected through knobs having means thereon for maintaining certain gears in mesh with other operating gears of the mechanism.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is an elevation partly in section of a computing head including a variator embodying the invention;

Figure 2 is a fragmentary plan view of a portion of the variator, the same being taken substantially in the plane as indicated by the line 2—2 of Figure 1;

Figure 3 is an enlarged sectional elevation through the variator, the same being taken substantially in a vertical plane through the cone shaft;

Figure 6 is an enlarged fragmentary sectional plan view of the price synchronizing means, the same being taken substantially in the plane, as indicated by the line 6—6 of Figure 1;

Figure 7 is a sectional elevation of the price synchronizing means shown in Figure 6, the same being taken substantially in the plane as indicated by the line 7—7 of Figure 6;

Figure 8 is an enlarged sectional elevation corresponding to Figure 3 showing a modified form of variating mechanism and taken substantially in the plane as indicated by the line 8—8 of Figure 10;

Figure 4:
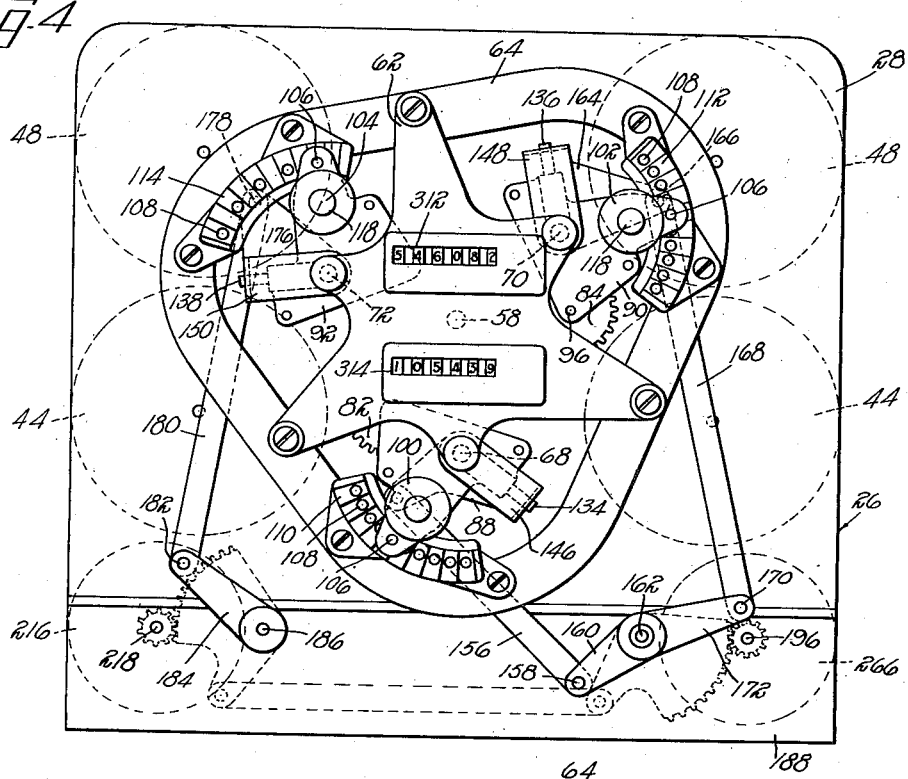
Figure 4 is an end elevation of the variator illustrated in Figure 1, the same looking toward the right as viewed in said figure.
Figure 5:
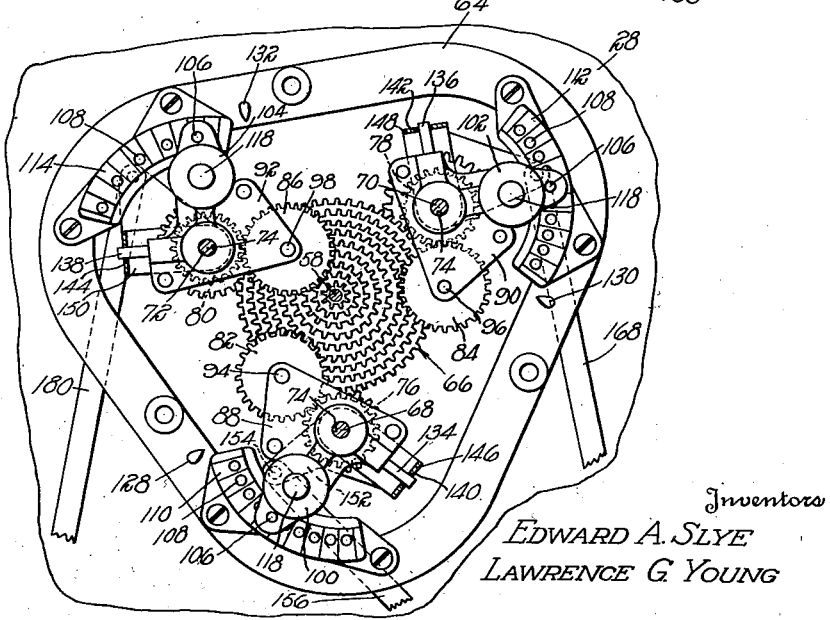
Figure 5 is a plan view of a portion of the variating mechanism, the same corresponding to Figure 4, but omitting the end plate to show more clearly the cone and supplementary shafts.

Referring first of all more particularly to the computing head illustrated in Figures 1 to 7 inclusive, it is of course understood that said head is adapted for many uses in computing, such as in the textile, machine, etc. arts. It is, however, particularly applicable to the so-called computing type of pump such as illustrated in Patent No. 2,151,239 Slye et al. granted March 21, 1939.

In a pump in use today embodying a computing head, the liquid dispensing apparatus consists essentially of a pump the suction side of which is adapted to be connected to a source of liquid supply, the pump being operated by suitable means such as an electric motor which may be controlled by a switch operable by means adjacent the hose hook. The outlet side of the pump may be connected through a suitable air separator to the inlet side of the meter, the liquid passing through the meter causing operation thereof, which in turn causes rotation of the so-called meter shaft, the rotation of said shaft being proportional to the amount of liquid passing through the meter. The outlet side of the meter is connected through the suitable sight gauge to the hose, which in turn is controlled by a nozzle having an operable nozzle valve therein. The meter shaft is the means of operating or controlling the operation of the computing head, and said meter shaft may be connected to the jack shaft 20 of the computing head as by the coupling 22. The shaft 20 is suitably journaled as at 24 in the frame 26, said frame including the front side member or plate 28 and the rear side member or plate 30 connected together to form said frame. The shaft 20 is provided with the bevel gear 32 meshing with the bevel gear 34 provided on the shaft 36, the shaft 36 being journaled in the side members and being provided with the gear 38. The gear 38 meshes with the gear 40 provided on the amount or gallons drive shaft 42, said drive shaft being journaled in the side members and being adapted to drive the gallons numeral wheels 44 rotatably mounted with respect to said shaft and inter-connected by suitable transfer mechanism.

Reset mechanism indicated generally at 46 and adapted to be selectively operated is provided for setting the amount wheels 44 and the cost wheels 48 to zero. The cost wheels 48 likewise operate through suitable transfer mechanism and are controlled from the cost driving shaft 50 provided with the driving gear 52, said shaft likewise being journaled in the side members 28 and 30. It is of course understood that the registering mechanism may have numeral wheels on each side of the computing head, like banks of wheels being operated and reset together. The gear 40 is provided with the gear 54 meshing with the gear 56 provided on the cone or driving shaft 58. The cone shaft is journaled in suitable bearings provided on the plate 28 and on the cover plate 62, said cover plate being supported on the supporting member 64 carried by the plate 28.

The shaft 58 is provided with the gear cone 66 having a suitable number of gear steps thereon (shown as nine). The supplementary shafts 68, 70 and 72 are spaced around said cone, said supplementary shafts being journaled in the plates 28 and 62 and are keyed as at 74 for slidable but non-rotatable connection to the sliding gears 76, 78 and 80 mounted on the respective shafts, said gears being connected to the gears 82, 84 and 86 in engagement with the selected gear steps of the cone through movement of the supporting arms 88, 90 and 92 to which said gears are pivoted as at 94, 96 and 98. Setting movement of the gears is accomplished by means of the knobs 100, 102 and 104 which rotate about the supplementary shafts, being provided with the pins 106 adapted to be received in suitable apertures 108 disposed in the quadrants 110, 112 and 114. The quadrants 110, 112 and 114 are supported on the member 64 and are substantially arcuately disposed around the supplementary shafts, and are provided on the underside thereof with the inclined plane surfaces 116. In the embodiment shown in Figures 1 to 7 inclusive, the quadrants 110, 112 and 114 are respectively for calibrations of increments of $\frac{1}{10}$¢, 1¢ and 10¢, and the gear ratios of the gear trains are calculated accordingly.

The knobs 100, 102 and 104 are provided with the plungers 118 normally urged outwardly by means of the springs 120, said plungers being pivotally connected as at 122 to the dogs 124, pivotally connected to the respective members 88, 90 and 92 as at 126. The dogs engage the under slope planes 116 of the quadrants 110, 112 and 114 for normally urging the pins 106 into their lowermost position in the apertures 108, tending to urge the respective gears 82, 84 and 86 into full engaged position with the selected steps of the gear cone.

Suitable fixed lugs 128, 130 and 132 are provided on the frame 64, said lugs being adapted to be engaged by the gears 82, 84 and 86 for preventing rotation of the respective supplementary shafts when the range arms are moved to zero set position, that is, whenever said gears are in engagement with said lugs the respective supplementary shaft controlled by said gears is set for zero registration. The members 88, 90 and 92 are provided with pins 134, 136 and 138 slidably mounted in suitable slots 140, 142 and 144 provided in the bails 146, 148 and 150, said bails being pivotally mounted about the axis of the respective supplementary shafts. The bail 146 is provided with the lever arm 152 pivotally connected as at 154 to the link 156, said link being pivotally connected as at 158 to the lever 160 fixedly mounted on the shaft 162. The bail 148 is provided with the arm 164 pivotally connected as at 166 to the link 168, said link being pivotally connected as at 170 to the lever 172 fixed to the sleeve 174 rotatably mounted on the shaft 162. The bail 150 is provided with the arm 176 pivotally connected as at 178 to the link 180, said link being pivotally connected as at 182 to the lever 184, said lever being fixedly mounted on the shaft 186.

The shafts 162 and 186 are suitably journaled in a frame member 188 carried by the frame member 26, and the shaft 162 is provided with the gear segment 190 meshing with the gear 192 provided on the tenths daily price indicating wheel 194 rotatably mounted on the shaft 196 suitably supported in the frame member 188. The gear segment 190 is provided with the arm 198 pivotally connected as at 200 to the link 202, extending transversely of the frame 188, being pivotally connected as at 204 to the arm 206, the arm 206 being mounted on the member 208 pivotally mounted on the shaft 186 and connected through the sleeve 210 to the gear segment 212 meshing with the gear 214 provided on the tenths daily price numeral wheel 216 rotatably mounted on the shaft 218 supported in the frame member 188.

The sleeve 174 is connected through the member 220 to the gear segment 222, meshing with the gear 224 provided on the cents or units daily price numeral wheel 226 which is rotatably mounted on the shaft 196. The gear segment 222 is provided with the arm 228 pivotally connected as at 230 to the link 232, said link being pivotally connected as at 234 to the arm 236 of the gear segment 238, meshing with the gear 240 of the units or cents daily price numeral wheel 242 pivotally mounted on the shaft 218. The shaft 186 is provided with the gear segment 244 meshing with the gear 246 of the tens daily price numeral wheel 248 pivotally mounted on the shaft 218, and said shaft 186 is provided with the depending arm 250 pivotally connected as at 252 to the link 254, the link 254 being pivotally connected as at 256 to the arm 260 provided with the gear segment 262 meshing with the gear 264 provided on the daily price numeral wheel 266 rotatably mounted on the shaft 196. It will thus be seen that the number of knobs to set the variator correspondingly moves the daily price synchronizing means to indicate the setting of the variator.

Supplementary shafts 68, 70 and 72 are provided with the gears 268, 270 and 272 which may be recessed for accommodating the hub or bearing of the respective arms 88, 90 and 92, said gears meshing with the gears 274, 276 and 278 rotatably mounted on the shaft 58. The gear 274 is provided with the gear 280 meshing with the pinions 282 pivotally mounted as at 284 on the gear 276 and being provided with the gears 286 meshing with the gear 288 pivotally mounted with respect to said shaft 58 and said gear 276. The gear 288 is provided with the gear 290 meshing with the pinions 234 pivotally mounted as at 296 on the gear 278 and the pinions 294 are provided with the gears 298 meshing with the gear 300 rotatably mounted with respect to the shaft 58.

Said gear 300 is connected to the gear 304, in turn connected to the gear 306 pivotally mounted on the jack shaft 308 carried by the plate 28, said gear 306 being provided with the gear 310 meshing with the gear 52 for driving the cost driving shaft 50. The plate 68 may be provided with the cost totalizer 312 operated with the cost driving shaft and also may be provided with the amount totalizer 314 operating with the gallons shaft 42. These totalizers preferably are cumulative.

Figure 9:
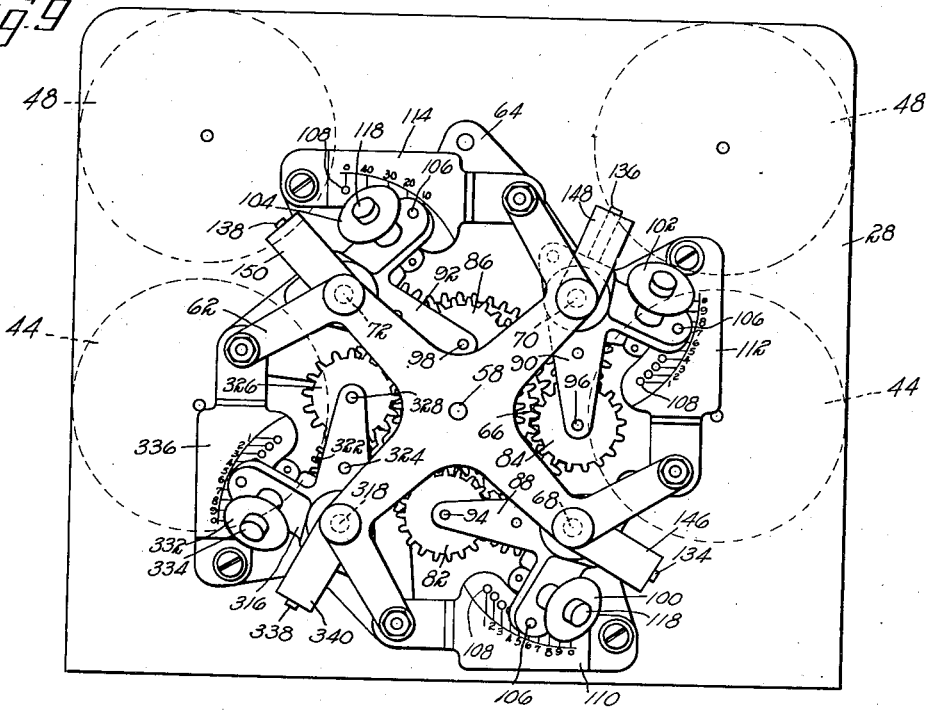
Figure 9 is an end elevation of the modified form of variator shown in Figure 8.
Figure 10:
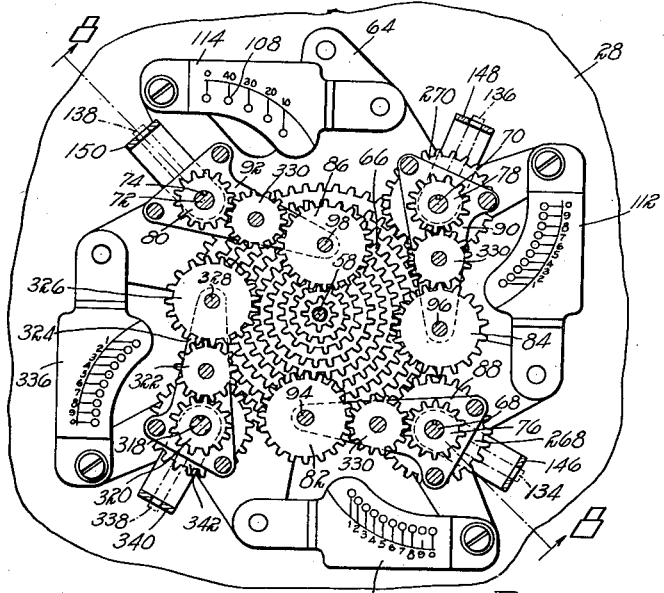
Figure 10 is a plan view corresponding to Figure 5 showing the variator illustrated in Figure 9.

Referring now to the modification illustrated in Figures 8 to 10 inclusive, a similar variating mechanism is illustrated, and like numerals are used to designate like parts. On this device, however, it is contemplated that computation also may be effected in increments of one-hundredth (1/100) of a cent, and to this end an additional range arm 316 is provided slidably mounted on the supplementary shaft 318. The supplementary shaft 318 is provided with the pinion 320 slidably but non-rotatably mounted thereon, said pinion meshing with the idler pinion 322 pivoted to said range arm as at 324 and driving the gear 326, said gear 326 being pivoted to said range arm at 328 and adapted to engage a selected gear step of the cone.

It is to be noted in this modification that the idlers 330 are interposed in each of the range arms. The range arm 316 is provided with the knob 332 similar to the knobs 100, 102 and 104, being provided with a suitable plunger 334 similar to the plunger 118 and controlling a pawl (not shown) engaging behind the quadrant 336 graduated in increments of one-hundredth (1/100) of a cent, the gear ratios being arranged accordingly.

It is also to be noted that the quadrants 336, 110 and 112 are graduated in ten parts, being numbered one through nine to zero, and the quadrant 114 is graduated ten, twenty, thirty, forty and zero. The range arm 316 is provided with the pin 338 movably mounted in a slot provided in the bail 340, said bail being similar to the bails 146, 148 and 150, and controlling through a suitable link (not shown) an arm preferably provided on the shaft 186 for controlling the one-hundredth (1/100) daily price numeral wheels.

The supplementary shaft 318 is provided with the gear 342 meshing with the gear 344 rotatably mounted on the cone shaft 58. The gear 344 is provided with the gear 346 meshing with the pinions 348 pivotally mounted as at 350 on the gear 352 (similar to the gear 274), and the pinions 348 are provided with the gear 354 meshing with the gear 356 provided with the gear 358, meshing with the pinions 360 (similar to the pinions 282). The pinions 360 are pivotally mounted as at 362 on the gear 364 (similar to the gear 276), and the pinions 360 are provided with the gears 366, meshing with the gear 368 (similar to the gear 288), rotatably mounted on the shaft 58 and provided with the gear 370 (similar to the gear 290). The gear 370 meshes with the pinions 372 (similar to the pinions 294), the pinions 372 being pivotally mounted as at 374 on the gear 376 (similar to the gear 278). The pinions 372 are provided with the gears 378 meshing with the gear 380 (similar to the gear 300), said gear being rotatably mounted on the shaft 58 and being connected to the gear 382 (similar to the gear 304) for transmitting the added motion, or computed price, to the price numeral wheels 48. The connections between the driving shaft and the lower or gallons numeral wheels 44 are similar to those described with respect to Figures 1 to 7, inclusive.

It is to be noted that the gears 344, 352, 364 and 376 driven by the gears 342, 268, 270 and 272, as well as the gears 356, 368 and 380, are rotatably mounted with respect to the cone shaft 58 and to each other, and form the differential for adding the movements of the supplementary shafts for the price indicating wheels 48.

In the operation of the forms of the device illustrated herein, in order to set the devices, it is only necessary to depress the plungers 118 of the respective knobs, lifting said knobs so that the pins 106 are lifted out of the respective apertures 108. The range arms then can be shifted to the selected prices and the pins 106 dropped in the proper apertures 108, at which time the gears on the range arms will engage the proper gear steps of the cone. This movement sets up the posted price on the daily price indicating wheels 216, 240, 248, 194, 226 and 266 in the manner already described.

Operation of a liquid dispensing apparatus, for example, or of any other device operating the shaft 22, causes rotation of the cone shaft 58, the supplementary shafts, and the differential to cause the upper banks of numeral wheels 48 to move to their proper registration. At the same time the lower banks of numeral wheels are being directly driven in accordance with the amount dispensed, that is, the product of the registration shown on the wheels 44 and the daily price wheels will be shown on the wheels 48.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In variating mechanism, the combination of a drive shaft, gears of different diameters non-rotatably mounted on said shaft, supplementary shafts disposed adjacent said drive shaft and having the axes thereof parallel to the axis of said drive shaft, a driven member rotatably mounted on said drive shaft, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

2. In variating mechanism, the combination of a drive shaft, gears of different diameters non-rotatably mounted on said shaft, supplementary shafts disposed adjacent said drive shaft and having the axes thereof parallel to the axis of said drive shaft, a driven member, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

3. In variating mechanism, the combination of a drive shaft, gears of different diameters non-rotatably mounted on said shaft, supplementary shafts disposed adjacent said drive shaft and having the axes thereof parallel to the axis of said drive shaft, a driven member, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

4. In variating mechanism, the combination of a drive shaft, gears of different diameters non-rotatably mounted on said shaft, supplementary shafts disposed adjacent said drive shaft and having the axes thereof parallel to the axis of said drive shaft, a driven member rotatably mounted on said drive shaft, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

5. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member rotatably mounted on said drive shaft, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

6. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

7. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

8. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member rotatably mounted on said drive shaft, differential means rotatably monuted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, and means carried by said arms and resiliently engaging said positioning member and urging said positioning means into engagement to thereby insure full engagement between the gears carried by the arms and the selected gear of said first named gears.

9. In variating mechanism, the combination of a drive shaft, gears of different diameters nonrotatably mounted on said shaft, supplementary shafts disposed adjacent said drive shaft and having the axes thereof parallel to the axis of said drive shaft, a driven member rotatably mounted on said drive shaft, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a shaft, a sleeve rotatably mounted on said shaft, a connection between said shaft and one of said setting arms, a connection between said sleeve and another of said setting arms, and means operated by said last named shaft and sleeve for visibly showing the setting.

10. In variating mechanism, the combination of a drive shaft, gears of different diameters nonrotatably mounted on said shaft, supplementary shafts disposed adjacent said drive shaft and having the axes thereof parallel to the axis of said drive shaft, a driven member rotatably mounted on said drive shaft, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

11. In variating mechanism, the combination of a drive shaft, gears of different diameters nonrotatably mounted on said shaft, supplementary shafts disposed adjacent said drive shaft and having the axes thereof parallel to the axis of said drive shaft, a driven member, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a shaft, a sleeve rotatably mounted on said shaft, a connection between said shaft and one of said setting arms, a connection between said sleeve and another of said setting arms, and means operated by said last named shaft and sleeve for visibly showing the setting.

12. In variating mechanism, the combination of a drive shaft, gears of different diameters nonrotatably mounted on said shaft, supplementary shafts disposed adjacent said drive shaft and having the axes thereof parallel to the axis of said drive shaft, a driven member, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, connections from different arms to the sleeve on said first spaced shaft and the first spaced shaft respectively.

13. In variating mechanism, the combination of a drive shaft, gears of different diameters non-rotatably mounted on said shaft, supplementary shafts disposed adjacent said drive shaft and having the axes thereof parallel to the axis of said drive shaft, a driven member, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a shaft, a sleeve rotatably mounted on said shaft, a connection between said shaft and one of said setting arms, a connection between said sleeve and another of said setting arms, and means operated by said last named shaft and sleeve for visibly showing the setting.

14. In variating mechanism, the combination of a drive shaft, gears of different diameters non-rotatably mounted on said shaft, supplementary shafts disposed adjacent said drive shaft and having the axes thereof parallel to the axis of said drive shaft, a driven member, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

15. In variating mechanism, the combination of a drive shaft, gears of different diameters non-rotatably mounted on said shaft, supplementary shafts disposed adjacent said drive shaft and having the axes thereof parallel to the axis of said drive shaft, a driven member rotatably mounted on said drive shaft, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

16. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member rotatably mounted on said drive shaft, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

17. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member, differential means connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

18. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

19. In variating mechanism adapted to operate registering means wherein the indicating means thereof is operated by a shaft, the combination of a drive shaft, the axis thereof being parallel to the axis of the first named shaft, gears of different diameters driven by said drive shaft, supplementary shafts disposed adjacent said drive shaft and having the axes thereof parallel to the axis of said drive shaft, a driven member rotatably mounted on said drive shaft, differential means rotatably mounted on said drive shaft and connecting said supplementary shafts to said driven member, a setting arm slidably mounted on each of said supplementary shafts, a gear carried by said arm and connected to the adjacent supplementary shaft and adapted to be moved to selectively engage said first named gears, a positioning member adjacent each of said supplementary shafts provided with positioning means, cooperating positioning means on the setting arms adapted to engage said first named positioning means when the gear carried thereby is in mesh with the corresponding gear of said first named gears, means carried by said arms and resiliently engaging said positioning member and urging said positioning means into engagement to thereby insure full engagement between the gears carried by the arms and the selected gear of said first named gears, indicating means to show the setting of said variating mechanism, said indicating means including a pair of spaced shafts, the axes of said shafts being parallel to the axis of said drive shaft, a numeral wheel shaft adjacent each of said spaced shafts having numeral wheels thereon for visibly indicating the setting of said arms, the first of said spaced shafts being operatively connected to one of said numeral wheels, a sleeve on the second of the spaced shafts operatively connected to the diagonally disposed numeral wheel on the first of the spaced shafts, a connection between the first of said spaced shafts and said sleeve, a sleeve on the first of said spaced shafts connected to the adjacent intermediate numeral wheel, a member rotatably mounted on the second of said spaced shafts and connected to the adjacent intermediate numeral wheel and to said sleeve on said first spaced shaft, a rotatable member mounted on said first spaced shaft and connected to the adjacent numeral wheel, a connection to the second spaced shaft, a connection from said second spaced shaft to the numeral wheel diagonally disposed from the last named numeral wheel, a connection from one of said arms to the second named shaft, and connections from different arms to the sleeve on said first spaced shaft and the first spaced shaft respectively.

EDWARD A. SLYE.
LAWRENCE G. YOUNG.